US012803904B2

(12) United States Patent
Boyer et al.

(10) Patent No.: US 12,803,904 B2
(45) Date of Patent: Nov. 17, 2026

(54) METHOD AND SYSTEM FOR INTRA- AND INTER-CLUSTER COMMUNICATION

(71) Applicant: BULL SAS, Les Clayes-sous-bois (FR)

(72) Inventors: Quentin Boyer, Meylan (FR); Mathieu Barbe, Seyssinet Pariset (FR)

(73) Assignees: BULL SAS, Les Clayes-sous-Bois (FR); COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 0 days.

(21) Appl. No.: 18/955,423

(22) Filed: Nov. 21, 2024

(65) Prior Publication Data

US 2025/0168110 A1 May 22, 2025

(30) Foreign Application Priority Data

Nov. 21, 2023 (EP) .................................... 23307012

(51) Int. Cl.
*H04L 45/00* (2022.01)
*H04L 12/66* (2006.01)
*H04L 45/745* (2022.01)

(52) U.S. Cl.
CPC .............. *H04L 45/46* (2013.01); *H04L 12/66* (2013.01); *H04L 45/745* (2013.01)

(58) Field of Classification Search
CPC ....... H04L 45/46; H04L 45/745; H04L 12/66; G06F 15/163
See application file for complete search history.

(56) References Cited

U.S. PATENT DOCUMENTS 5,371,852 A * 12/1994 Attanasio .............. G06F 9/5061 709/245
6,993,034 B1 * 1/2006 Block ..................... H04L 45/54 709/245

(Continued)

FOREIGN PATENT DOCUMENTS

CN 101478490 A * 7/2009
CN 113556286 A * 10/2021 ............. H04L 45/46

(Continued)

OTHER PUBLICATIONS

European Search Report and Written Opinion issued in EP23307012.7, dated May 23, 2024 and English translations thereof.

*Primary Examiner* — James R Sheleheda
(74) *Attorney, Agent, or Firm* — ARC IP Law, PC; Joseph J. Mayo

(57) ABSTRACT

A high-performance computer with a plurality of clusters by an IP network. Each cluster includes a gateway that transmits data between the clusters and the IP network, storing a first routing table associating a gateway address with a destination IP address in the cluster, and nodes. Each node runs an instance of an application and a network card implementing an interconnection protocol and an address resolution protocol. The network card stores a second routing table associating an address of a gateway of a first cluster with the identifier of another cluster accessible from the gateway of the first cluster. Each node stores a third routing table associating an identifier of an application instance with an identifier of the cluster including the node running the application instance, with a network identifier of the application instance and with an IP address of the network card of the node running the application instance.

15 Claims, 4 Drawing Sheets

(56) References Cited

U.S. PATENT DOCUMENTS

| | | | | |
|---|---|---|---|---|
| 7,627,691 | B1 * | 12/2009 | Buchsbaum | H04L 61/00 370/395.31 |
| 8,125,991 | B1 * | 2/2012 | Schlansker | H04L 45/74591 370/395.31 |
| 9,439,128 | B2 * | 9/2016 | Soneda | H04W 40/02 |
| 11,188,394 | B2 * | 11/2021 | Dinan | G06F 9/52 |
| 11,366,828 | B1 * | 6/2022 | Srikantan | G06F 11/2094 |
| 2004/0260832 | A1 * | 12/2004 | Kota | G06F 15/16 709/236 |
| 2012/0082160 | A1 * | 4/2012 | Patel | H04L 61/251 370/392 |
| 2014/0185611 | A1 * | 7/2014 | Lie | H04L 45/34 370/355 |
| 2015/0043576 | A1 | 2/2015 | Dixon et al. | |
| 2015/0222533 | A1 * | 8/2015 | Birrittella | H04L 45/66 370/392 |
| 2015/0263899 | A1 * | 9/2015 | Tubaltsev | H04L 45/033 370/254 |
| 2016/0100008 | A1 * | 4/2016 | Accetta | H04L 67/1097 709/217 |
| 2016/0179587 | A1 * | 6/2016 | Cole | G06F 9/542 719/318 |
| 2016/0248663 | A1 * | 8/2016 | Patel | H04L 45/24 |
| 2017/0064005 | A1 * | 3/2017 | Lee | H04L 67/141 |
| 2017/0085442 | A1 * | 3/2017 | Dinan | H04L 47/30 |
| 2017/0171144 | A1 * | 6/2017 | Sagiraju | G06F 16/00 |
| 2017/0180271 | A1 * | 6/2017 | Wilkinson | H04L 49/351 |
| 2017/0286144 | A1 * | 10/2017 | Barzik | G06F 9/5077 |
| 2018/0181604 | A1 * | 6/2018 | Marohn | G06F 16/00 |
| 2018/0234347 | A1 * | 8/2018 | Dinan | H04L 47/127 |
| 2019/0036868 | A1 | 1/2019 | Chandrashekhar et al. | |
| 2019/0102236 | A1 * | 4/2019 | Sur | G06F 9/3004 |
| 2020/0092254 | A1 * | 3/2020 | Goeringer | H04L 12/4641 |
| 2021/0036888 | A1 * | 2/2021 | Vadde Makkalla | H04L 12/4633 |
| 2021/0119930 | A1 * | 4/2021 | Debbage | H04L 1/1621 |
| 2021/0168061 | A1 * | 6/2021 | Kolesnik | H04L 67/10 |
| 2021/0406088 | A1 * | 12/2021 | Chen | G06F 21/44 |
| 2022/0121682 | A1 * | 4/2022 | Srikantan | G06F 11/1464 |
| 2023/0300002 | A1 * | 9/2023 | Shen | H04L 47/803 709/220 |
| 2025/0168110 | A1 * | 5/2025 | Boyer | H04L 12/66 |
| 2025/0225085 | A1 * | 7/2025 | Lakhotia | G06F 13/16 |
| 2025/0373564 | A1 * | 12/2025 | Fultaria | H04L 47/41 |

FOREIGN PATENT DOCUMENTS

| | | | | | |
|---|---|---|---|---|---|
| EP | 1983699 | A1 | * | 10/2008 | H04L 45/16 |
| EP | 4560482 | A1 | * | 5/2025 | H04L 45/745 |
| KR | 20120074948 | A | * | 7/2012 | H04W 40/02 |
| WO | 2022/146585 | | | 7/2022 | |

* cited by examiner

METHOD AND SYSTEM FOR INTRA- AND INTER-CLUSTER COMMUNICATION

This application claims priority to European Patent Application Number 23307012.7 filed 21 Nov. 2023, the specification of which is hereby incorporated herein by reference.

BACKGROUND OF THE INVENTION

Field of the Invention

The technical field of the invention is that of high-performance computing (HPC).

At least one embodiment of the invention relates to a method and a system for inter- and intra-cluster communication, in particular by configuring network cards in a particular way.

Description of the Related Art

High-performance computers (HPCs) are typically distributed in clusters, in order to spread the execution of applications across several machines. These high-performance computing applications require significant computing resources that cannot be installed on a single machine. For the largest calculations, between 10,000 and 100,000 machines are sometimes needed, and these machines are grouped together in clusters.

A cluster is a set of machines, often designed for the same application, at the same time, and with the same components. A cluster, for example, has a predefined topology, adapted to the execution of a particular application or type of application.

To interconnect these machines and create a cluster, specialized networks are required, such as those implementing interconnection protocols like Infiniband® or BXI® (Bull. eXascale Interconnect).

A problem arises when connecting several clusters to one another. Such a problem may arise, for example, if a user wants to combine an existing cluster with a new one, or with another existing cluster. At present, interconnecting a several of clusters to one another is not done, as each cluster is dedicated to the implementation of a specific application. To interconnect several clusters, it is often decided to use the Internet protocol suite to exchange data, with machines acting as “bridges” or “gateways”. These gateways copy data from the intra-cluster interconnection protocol, e.g. BXI, to the network protocol used to interconnect the two clusters, e.g. IP. But this type of cluster interconnection is mainly used to exchange data between applications, and does not deliver acceptable performance when running the same application on several clusters.

BXI networks use the Portals® application programming interface (API) as a communication protocol for inter-node communications.

A schematic representation of two interconnected clusters according to the prior art is shown in FIG. 1. Each cluster, 11 and 12 respectively, comprises two nodes, 111, 112 and 121, 122 respectively, an AFM 113 and 123 respectively, a switch 114 and 124 respectively, and a gateway 115 and 125 respectively. The nodes 11, 112, 121 and 122 are, for example, computing and/or storage nodes. The AFM 113 and 123 (Advanced Fabric Management) is the software responsible for managing and routing components of the cluster. Switches are components used to interconnect components of the cluster. Finally, the gateways 115 and 125 translate data from the protocol of the clusters 11 and 12 into the protocol of the network 2 interconnecting the two clusters 11 and 12, and vice versa.

For its first-generation interconnection network, BXI network cards and switches use their own link protocol (layer 2 of the OSI network model). This approach makes sense when considering a closed computing cluster as planned for this generation and as it currently exists. In this approach, all OSI Layer 3 packets must be encapsulated in a BXI frame to navigate the network. BXI switches 114 and 124 are in charge of switching frames to the right destination using the NID Portals (with NID standing for Network Identifier, which identifies the node's network card) present in the level 2 header, while relying on the cluster topology built by AFM 113 and 123. In this approach, all devices connected to the BXI network must be compatible with the BXI level 2 link layer. The use of general-purpose switches or routers is therefore not permitted. To overcome this constraint, network gateways 115 and 125 have been set up, with BXI cards on the cluster end and standard Ethernet or InfiniBand cards on the network 2 end.

What's more, none of the existing cluster networks can handle the existence of another cluster. It is therefore not possible for a first node 111 of the first cluster 11 to directly address another node 121 of the second cluster 12.

There is therefore a need for an inter-cluster communication solution.

BRIEF SUMMARY OF THE INVENTION

At least one embodiment of the invention offers a solution to the above-mentioned problems, enabling high-performance inter-cluster data exchanges.

One or more embodiments of the invention relates to a high-performance computer comprising a plurality of clusters interconnected by an IP network, each cluster comprising:

- At least one Ethernet gateway configured to transmit data between the cluster and the IP network storing at least one first routing table comprising at least, for each other cluster of the plurality of clusters, an association of a gateway address with a destination IP address comprised in the cluster comprising the gateway,
- A plurality of computing and/or storage nodes, each node:
  - being configured to run at least one instance of a high-performance computing or storage application,
  - comprising at least one network card implementing an Ethernet-based high-performance interconnection protocol and being configured to implement an address resolution protocol, the network card storing at least one second routing table comprising at least, for each other cluster of the plurality of clusters, an association of an address of a gateway of the first cluster with the identifier of the other cluster accessible from the gateway of the first cluster,
  - storing at least one third routing table comprising at least, for each other cluster of the plurality of clusters, an association of an identifier of an application instance with an identifier of the cluster comprising the node running the application instance, with a unique network identifier of the application instance, and with an IP address of the network card of the node running the application instance,
- At least one intra-cluster interconnection switch configured to connect each node and the gateway.

By way of at least one embodiment of the invention, it is possible to carry out inter-cluster data exchanges via a high-performance protocol such as BXI or Infiniband, as long as this protocol is at least partially Ethernet-based. This is made possible by simply configuring the physical (that is, non-virtual) network cards of the cluster nodes, initializing them with a predefined routing table and predefined instructions for transmitting an inter-cluster data request. This is also made possible by the implementation of particular naming of the various components of the network, and the use of an address resolution protocol to obtain the address of the target gateway. Finally, the invention enables a significant simplification of the network gateways of the clusters, using simple IP routers rather than complex, costly gateways comprising two network cards and means dedicated to translating one network protocol into another, while at the same time improving inter-cluster data exchange performance.

In addition to the features mentioned in the preceding paragraph, the system according to at least one embodiment of the invention may have one or more complementary features from the following, taken individually or according to all technically plausible combinations:

- wherein the Ethernet-based high-performance interconnection protocol implements a high-performance network library.
- the Ethernet-based high-performance interconnection protocol is BXI® or Infiniband® respectively, and the high-performance network library is Portals® or Verbs® respectively.
- a network identifier and a process identifier are assigned to each instance of the high-performance computing application, the network identifier being formed from an identifier of the cluster wherein the node running the instance is located, an identifier of the node running the instance or of a virtual machine running the instance, and a physical identifier of the network card of the node running the instance.
- at least one node of the plurality of compute nodes comprises a virtual machine running the instance.

At least one embodiment of the invention relates to a method of inter-cluster communication in a high-performance computer according to the invention, the method comprising:

- Receipt, by a network card of a sending node of the plurality of nodes of the first cluster, of a request to send data to at least one destination instance executed by a destination node of the plurality of nodes of the second cluster, the request coming from an instance of a high-performance computing application and comprising an identifier of the destination instance and at least one data item,
- Transcription, by the network card of the sending node, of the request received into a request from the network library of the high-performance interconnection protocol, the transcription of the request comprising the transcription of the identifier of the destination instance into a unique identifier in a format of the network library,
- Encapsulation, by the network card of the sending node, of the transcribed request in an IP packet containing the IP address of the destination network card,
- Encapsulation of the IP packet in an Ethernet frame comprising the gateway address of the first cluster,
- Transmission of the IP packet via the switch and gateway of the first cluster to the gateway of the second cluster,
- Transmission, by the gateway of the second cluster, of the IP packet to the destination network card of the node running the destination instance,
- Decapsulation, by the destination network card, of the Ethernet frame and IP packet to obtain the request comprising the at least one data item,
- Transmission of the at least one data item, by the destination network card, to the destination instance.

In at least one embodiment, the method further comprises, after the transcription step and before the step of encapsulation in an IP packet, a step of comparison, by the network card of the sending node, of the cluster identifier of the network identifier of the destination instance with the cluster identifier of the sending network card, the inter-cluster communication method being continued only if the cluster identifier of the network identifier of the destination instance is different from the cluster identifier of the sending network card.

In at least one embodiment, the method further comprises, between the step of encapsulating the request in the IP packet and the encapsulation of the IP packet in the Ethernet frame, a step of sending, by the network card of the sending node, of an address resolution request from an IP address of the gateway of the first cluster to obtain a physical address of the gateway of the first cluster, the IP address of the gateway of the first cluster being stored in the second routing table associated with the identifier of the second cluster.

In at least one embodiment, the method further comprises the sending of an acknowledgment of receipt of the at least one data item, by the receiving network card, to the sending network card.

In at least one embodiment, the high-performance network library used is the Portals® network library, and wherein the format of the network library is an identifier comprising the network identifier of the destination instance and the process identifier of the destination instance.

In at least one embodiment, which the IP packet comprises a header indicating that the encapsulated request is a Portals® request.

One or more embodiments of the invention and its different applications will be better understood upon reading the following disclosure and examining the accompanying figures.

BRIEF DESCRIPTION OF THE DRAWINGS

The figures are presented by way of reference and are in no way limiting to the invention.

DETAILED DESCRIPTION OF THE INVENTION

Unless otherwise stated, the same element appearing in different figures has the same reference.

At least one embodiment of the invention relates to a system and a method for exchanging data between clusters of the system. The system comprises several computing clusters. The system is, for example, a high-performance computing center, configured to run a high-performance computing application. The components described below are physical components, allowing simple implementation and avoiding virtualization, that is the implementation of virtual networks.

Figure 1:
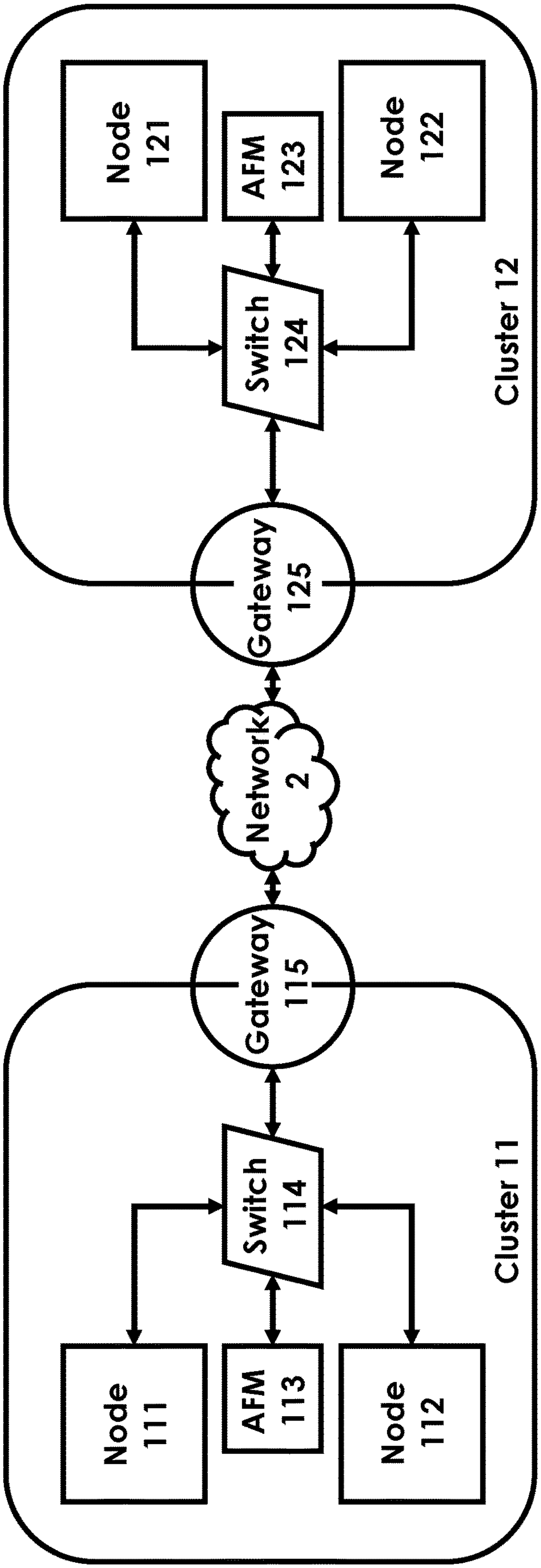
Fig. 1 Prior Art
FIG. 1 shows a schematic depiction of a system according to the prior art.
Figure 2:
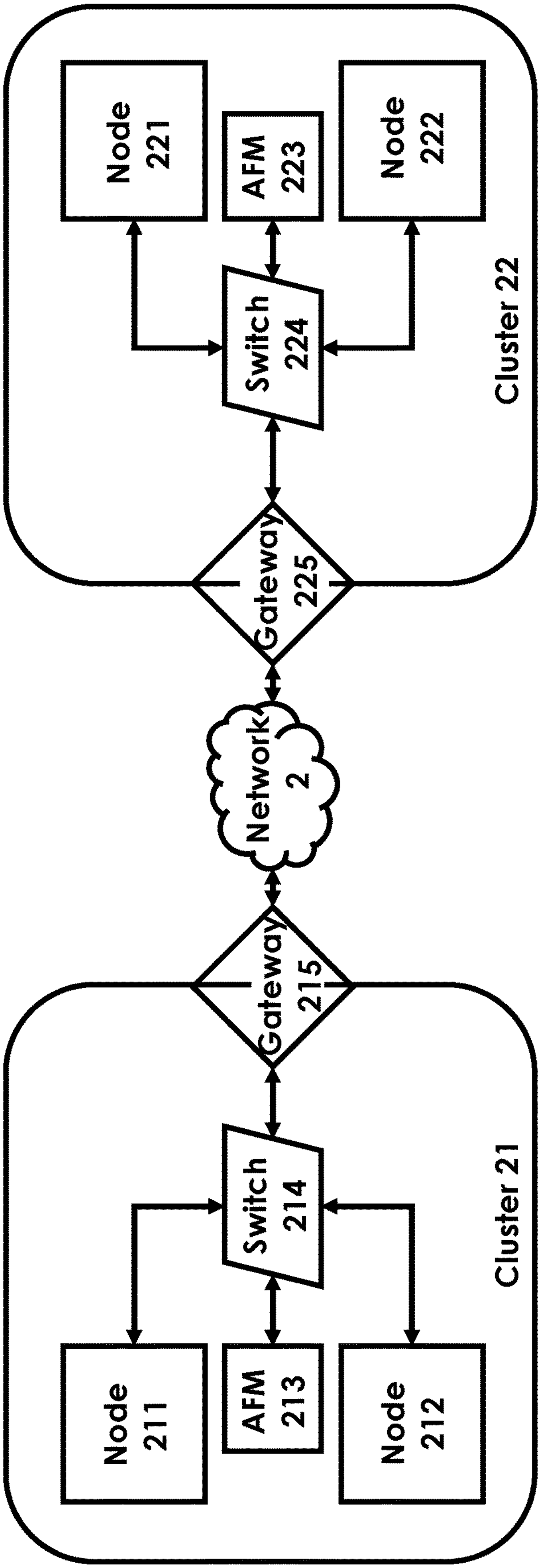
FIG. 2 shows a schematic depiction of a system according to one or more embodiments of the invention.

The system according to one or more embodiments of the invention is shown schematically in FIG. 2. The system comprises a plurality of clusters. FIG. 2 shows only two clusters 21 and 22, but the system according to at least one embodiment of the invention may comprise more than two clusters. The clusters are linked by a network 2, the network 2 being an IP (Internet Protocol) network, interconnecting the clusters. The network 2 is a level 3 network in the OSI model (Open Systems Interconnection). According to one or more embodiments of the invention, the clusters represent Ethernet networks on level 2 of the OSI model.

In order for the clusters to behave like Ethernet subnetworks according to at least one embodiment of the invention, certain physical components of the clusters are modified, in particular the compute nodes.

Firstly, each cluster's physical gateway linking the cluster to the network 2 is a simple physical Ethernet router, that is with physical Ethernet ports. In this way, the gateways 215 and 225 in the clusters 21 and 22 respectively are physical Ethernet routers, in contrast to the prior art, which comprises complex gateways with several network cards. The gateways are physical devices (that is not virtualized devices). Each gateway stores a first routing table, associating a gateway address with a destination IP address comprised in the cluster comprising the gateway. For example, such a routing table stored by gateway 215 comprises the following association:

IP address of the gateway 225, destination IP address and network mask of the cluster comprising the gateway.

Each cluster 21 and 22 comprises at least one interconnection switch 214 and 224 respectively. These interconnection switches 214 and 224 are physical devices. For example, these interconnection switches are interconnection switches using a high-performance Ethernet-based interconnection protocol, such as BXI® or Infiniband®.

These interconnection switches, 214 and 224 respectively, connect all the nodes in their cluster 21 and 22 respectively to the gateway 215 and 225 respectively. In this way, the interconnection switch 214 interconnects the nodes 211 and 212 and the gateway 215. The interconnection switch 224 interconnects the nodes 221 and 222 and the gateway 225.

The nodes of the cluster are configured to route outgoing data outside the cluster and incoming data inside the cluster.

Figure 3:
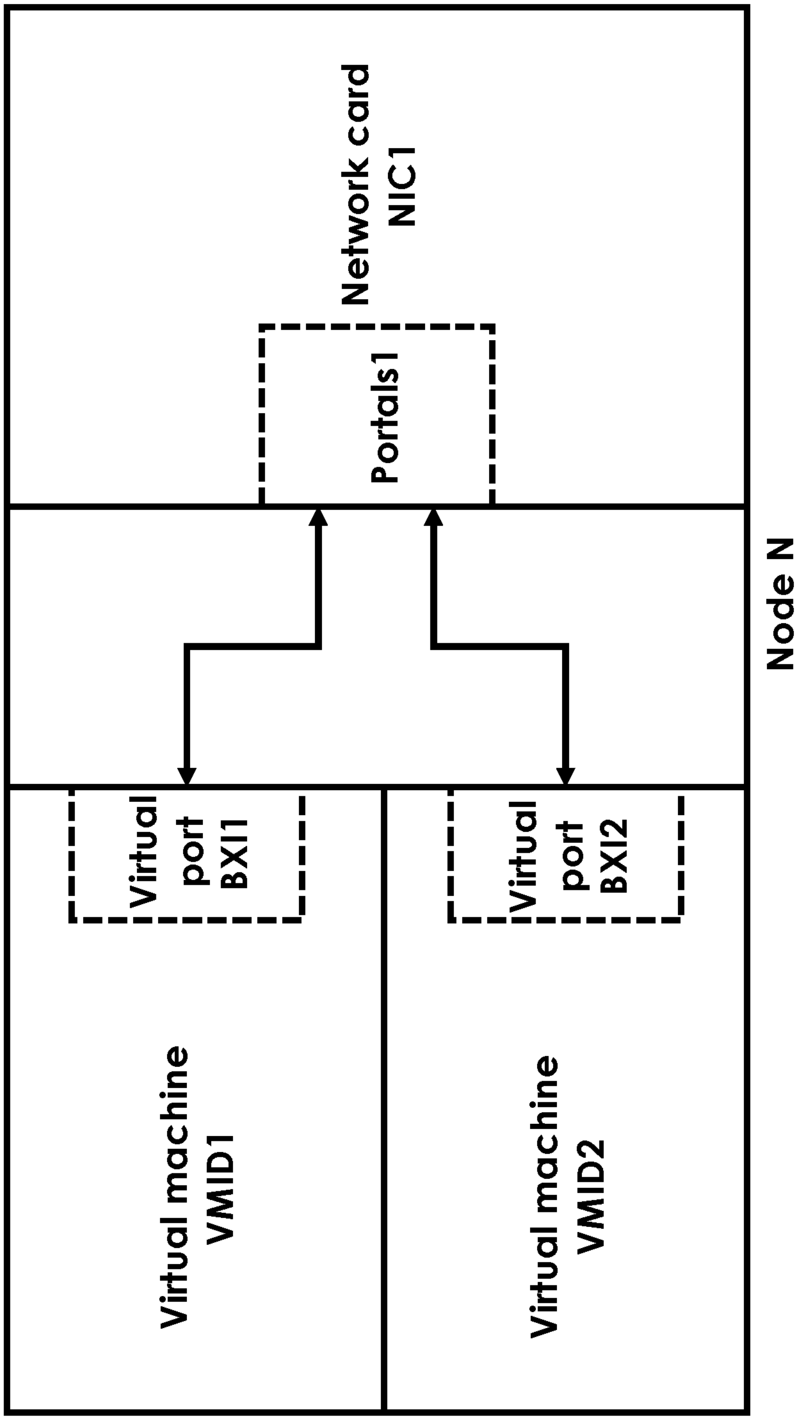
FIG. 3 shows a schematic depiction of a node of a cluster of the system according to one or more embodiments of the invention.

FIG. 3 shows a schematic representation of a node N, according to one or more embodiments of the invention. Every node in every cluster in the system has the architecture of the node N shown in FIG. 3, by way of at least one embodiment. The node N shown in FIG. 3 comprises at least one processor and one memory. The processor can execute at least one instance of a high-performance computing application, distributed over the entire system. To achieve this, the processor can either run the application instance directly, or run one or more virtual machines VMID1 and VMID2, each running one instance of the application. In FIG. 3, the node N has two virtual machines VMID1 and VMID2, but the at least one embodiment of the invention is not limited to two virtual machines. In this way, the two clusters 21 and 22 are each running different instances of the same high-performance computing application. At least one embodiment of the invention enables these instances to communicate with each other, even if they are not located on the same cluster.

For this purpose, the node N comprises a network card NIC1. The network card NIC1 is a physical device. The network card NIC1 implements high-performance Ethernet-based interconnection protocols such as BXI® or Infiniband®. The network card NIC1 enables the node N to communicate within and outside the cluster. To achieve this, the virtual machines VMID1 and VMID2 each comprise a virtual port, BX11 and BX12 respectively, configured to communicate with the network card NIC1. This enables the network card NIC1 to address the virtual machines VMID1 and VMID2.

According to one or more embodiments of the invention, the node N, which is a physical device, comprises two routing tables. A first routing table stored by the node N in a memory it comprises, is a routing table comprising, for each other cluster of the system, an association of an application instance identifier (also called "rank") with the cluster comprising the node running the instance, with a unique network identifier (NID, described later) of the application instance and with an IP address of the network card NIC1 of the node running the application instance. For example, the first routing table of the node 211 of the cluster 21 comprises the identifiers (rank) of all application instances running in the cluster 22 associated with a cluster 22 identifier, an application instance NID, and an IP address of the network card NIC1 of the node 222 of the cluster 22. For example, the first routing table of the node 211 of the cluster 21 comprises at least the following associations:

Rank of an instance of application 1, NID of the instance of application 1, IP address of the network card NIC1 of node 221, Rank of an instance of application 2, NID of the instance of application 2, IP address of the network card NIC1 of node 221, Rank of an instance of application 3, NID of the instance of application 3, IP address of the network card NIC1 of node 222, Rank of an instance of application 4, NID of the instance of application 4, IP address of the network card NIC1 of node 222, In addition, the first routing table may comprise the same information for all application instances running in cluster 21, that is the first routing table comprises all information concerning all instances running in the system.

This first routing table is used by the network card NIC1 when the instance being run by one of the two virtual machines VMID1 or VMID2 wants to send data to an instance of the application being run by cluster 22, in order to determine whether the destination instance belongs to cluster 21 or not. To do this, the network card NIC1 can store the first routing table, when the application instance being run by the node registers with the network card NIC1. Alternatively, in at least one embodiment, the first routing table can be loaded into the application instance being run by the node N and, on a network transfer request, the application instance then transmits the data from the first routing table to the network card NIC1.

The network card NIC1 stores a second routing table comprising, for each other cluster in the system, an IP address of the gateway of the first cluster (here, for example, cluster 21) associated with the identifier of the other cluster. Thus, for the system shown in FIG. 2, by way of one or more embodiment, the network card NIC1 of the node 211 comprises:

IP address of gateway 215, identifier of the cluster 22.

This second routing table is used by the network card NIC1 when the instance being run by one of the two virtual machines VMID1 or VMID2 wants to send data to an instance of the application being run by the cluster 22, to find out which gateway to use in its cluster 21 to reach cluster 22. In the example in FIG. 2, in at least one embodiment, there is only one gateway per cluster, but this table is useful when there is more than one gateway per cluster.

Each network card NIC1 uses a high-performance communications library, such as the Portals® library when the protocol is BXI®, or the Verbs® library when the protocol is Infiniband®. For example, Portals® version 4 can be used with BXI® version 2.

Figure 4:
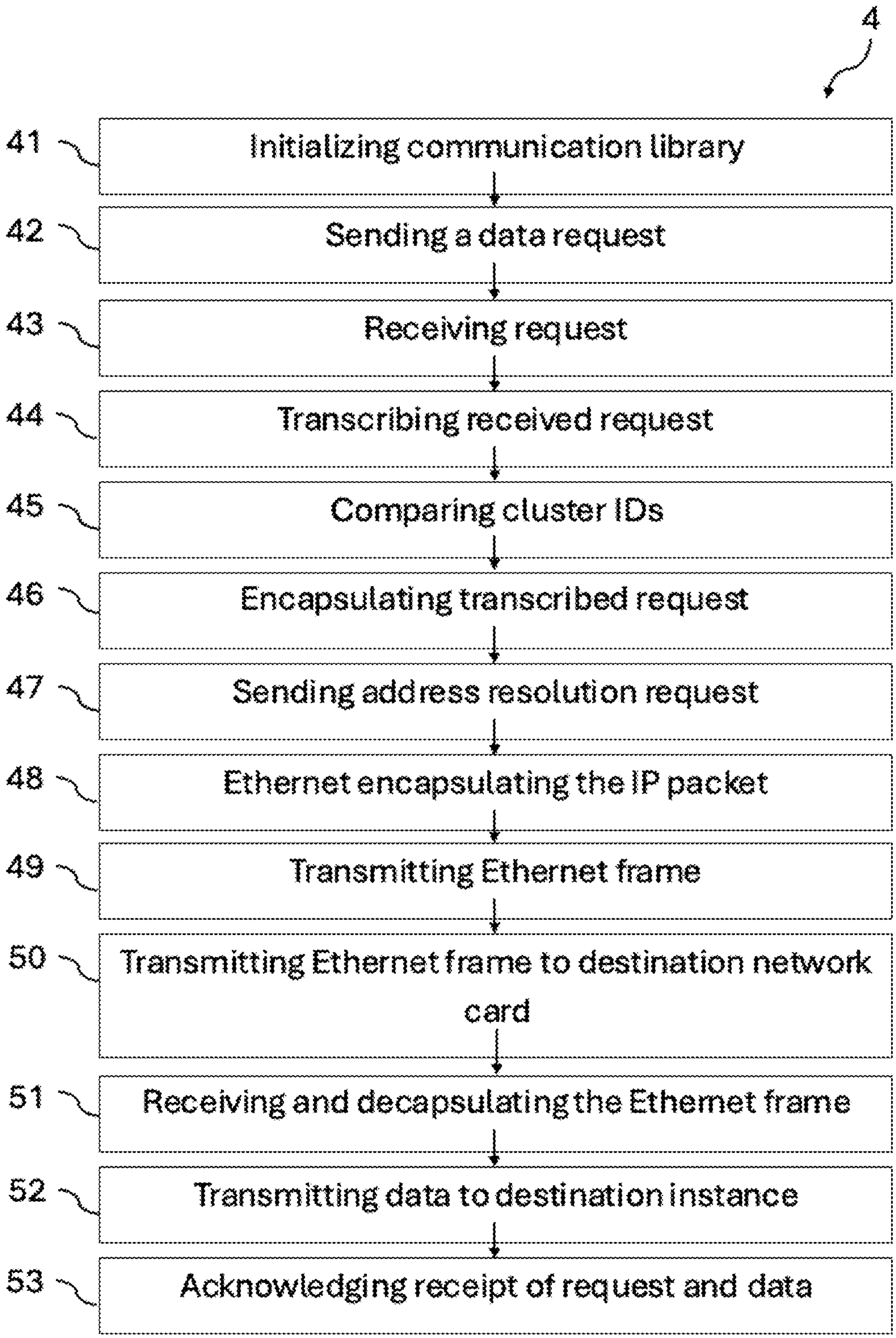
FIG. 4 shows a schematic depiction of a method according to one or more embodiments of the invention.

At least one embodiment of the invention also covers a method for exchanging data, that is communication, between one cluster of the system and another cluster of the system. The method 4 is shown schematically in FIG. 4, according to one or more embodiments of the invention. To illustrate the one or more embodiments of the invention, a data exchange between the virtual machine VMID1 of node 211 of cluster 21 and the virtual machine VMID2 of node 222 of cluster 22 will be described below.

The method 4 comprises a first step 41 of initializing the communication library. To achieve this, each instance of the high-performance computing application running in the system is assigned a unique network identifier and a process identifier (PID), so that it can be addressed by the other instances. The instance's unique network identifier (NID) is a triplet, which will be, for example, a Portals identifier if this network library is used. This Portals PID consists of three fields:

- The identifier of the cluster: cluster_id, for example 21.
- The identifier of the virtual machine or node running the instance: for example VMID1.
- The identifier of the network card NIC1 within the cluster: a physical network identifier within the cluster, e.g. 10.

An example of the NID of an instance of the high-performance computing application is 21-VMID1-10. In the initialization step 41, the unique network identifier NID, the IP address associated with the NID and the unique process identifier PID of each application instance are distributed to all participants, that is to all application instances and to the communication library engines of the network cards of the nodes running them.

The method 4 then comprises a step 42 wherein the instance of the high-performance computing application being run by the virtual machine VMID1 of the node 211 of cluster 21 sends a data request to the instance being run by the virtual machine VMID2 of the node 222 of cluster 22. The request comprises an identifier of the destination instance.

In step 43, this request is received by the network card NIC1 of node 211, known as the sending node.

The method 4 then comprises a step 44 wherein the network card NIC1 of node 211 transcribes the received request into a request from the network library of the high-performance interconnection protocol, for example into a Portals® request if the protocol used is BXIR. The transcription 44 of the request further comprises the transcription of the destination instance identifier into a unique network identifier in the communication library, that is Portals in this example. To do this, this unique Portals network identifier is used with the Portals process identifier (PID) of the destination instance to form a Portals identifier "ptl_process_t" used for Portals network operations. A ptl_process_t identifier will therefore uniquely identify a Portals process within a computing center, and therefore within the system.

The method 4 then comprises a step 45 wherein the network card NIC1 of the sending node 211 compares the cluster identifier comprised in the network identifier of the receiving instance with the cluster identifier of the sending network card NIC1. For example, in this case, the cluster identifier of the sending network card is 21 and the cluster identifier comprised in the network identifier of the destination instance is 22. This comparison 45 enables the transmitting NIC1 to determine whether the request is for the internal destination of the cluster 21 or for another cluster, in this case cluster 22. If the cluster identifier comprised in the network identifier of the destination instance is different from the cluster identifier of the sending network card, the sending network card knows that the communication is inter-cluster and the process is continued in the following steps.

The method 4 then comprises a step 46 wherein the network card NIC1 of sending node 211 encapsulates the request transcribed into a network library in an IP packet. The IP packet then identifies, in its header, the network protocol used in the encapsulated request, that is Portals in this example, as well as the IP address of the network card NIC1 of the target node 222.

To obtain a physical address for the gateway of the first cluster 21, the network card uses an address resolution protocol, such as ARP. Thus, the method 4 comprises a step 47 of sending, by the network card NIC1 of the sending node 211, an address resolution request from an IP address of the gateway 215 of the first cluster 21 to obtain a physical address, for example a MAC address, of the gateway 215 of the first cluster 21, the IP address of the gateway 215 of the first cluster 21 being stored in the first routing table of the network card NIC1 associated with the identifier of the second cluster 22. Finally, the gateway 215 is the only gateway of the cluster 21 that can access cluster 22.

The method 4 comprises a step 48 of Ethernet encapsulation of the IP packet, with the MAC address of the gateway of the first cluster as the destination header.

The Ethernet frame is then transmitted in step 49 by the network card NIC1 of node 211 to the gateway 215 of the cluster 21, via switch 214. Upon receipt of the Ethernet frame, in a conventional manner, the gateway 215 of the first cluster 21 decapsulates the Ethernet frame, reads the IP packet to obtain the destination IP address, that is the IP address of the destination network card, and encapsulates the IP packet in an Ethernet frame with a physical address of the gateway 225 for forwarding to the gateway 225 of the second cluster 22, based on the routing table stored by the gateway 215 and indicating that the second gateway 225 is the destination gateway for the cluster 22. The ARP protocol can also be used by the gateway 215 of the cluster 21 to obtain the MAC address of the gateway 225 of the cluster 22, if the gateway 215 does not yet store this information in its switching table.

Upon receipt, a step 50 comprises the transmission, by the gateway of the second cluster, of the Ethernet frame to the destination network card of the node running the destination instance. To do this, the gateway 225 of the cluster 22 decapsulates the Ethernet frame, reads the destination IP address, and uses a switching table that it stores to obtain the MAC address of the network library engine of the destination network card. This MAC address can be obtained by the ARP protocol if it is not yet comprised in its switching table.

In step 51, the network card NIC1 of the node 222 receives the Ethernet frame and decapsulates it. It also decapsulates the IP packet to obtain the Portals request and the at least one piece of data it contains, intended for the virtual machine VMID2 of the node 222. This data is then transmitted in a step 52, to the destination instance, by the network card, using the network library, for example Portals, the destination network identifier, and the destination process identifier.

In an optional but preferable step 53, the destination network card NIC1 of the node 222 acknowledges receipt of the Portals request and the data it contains to the sending network card, with the acknowledgment taking the reverse route.

Finally, it is specified that the Portals engine present in each network card NIC1 has a dedicated physical MAC address. This destination MAC address is used by Ethernet frames encapsulating a Portals payload. As with MAC addresses on virtual machine Ethernet interfaces, this one will be forged from the node's physical NID and a special VM identifier: 128. For example, the MAC address of the Portals engine on the network card NIC1 could be 00:06:128:00:00:00.

What is claimed is:

1. A high-performance computer comprising:

a plurality of clusters interconnected by an IP network, wherein each cluster of the plurality of clusters comprises at least one physical Ethernet gateway configured to transmit data between the cluster and the IP network, the at least one physical Ethernet gateway storing at least one first routing table comprising, for each remote cluster of the plurality of clusters, an association between a gateway address of a gateway of the remote cluster, and a destination IP address comprised in the remote cluster;

a plurality of physical computing and/or storage nodes, wherein each node of the plurality of physical computing and/or storage nodes is configured to run at least one instance of a high-performance computing and/or storage application, comprises at least one network card implementing an Ethernet-based high-performance interconnection protocol implementing a high-performance network library, and configured to implement an address resolution protocol, wherein the at least one network card stores at least one second routing table comprising, for each remote cluster of the plurality of clusters, an association between an address of a gateway of the cluster comprising the node, and an identifier of the remote cluster accessible through the gateway of the cluster comprising the node, and at least one third routing table comprising, for each remote cluster of the plurality of clusters, an association among an identifier of an application instance, an identifier of the remote cluster comprising the node running the application instance, a unique network identifier of the application instance, and an IP address of the at least one network card of the node running the application instance; and wherein the at least one network card comprises a communication-library engine implementing the high-performance network library, wherein a network identifier and a process identifier are assigned to each instance of the high-performance computing and/or storage application, wherein the communication-library engine is configured to receive an identifier of a destination application instance and translate the identifier of the destination application instance into an identifier in a format of the high-performance network library comprising the network identifier and the process identifier assigned to the destination application instance, and wherein the communication-library engine is configured to determine whether communication with the destination application instance is inter-cluster based on a cluster identifier comprised in the network identifier assigned to the destination application instance; and, at least one physical intra-cluster interconnection switch configured to connect said each node and the at least one physical Ethernet gateway.

2. The high-performance computer according to claim 1, wherein the Ethernet-based high-performance interconnection protocol implements a high-performance network library.

3. The high-performance computer according to claim 2, wherein the Ethernet-based high-performance interconnection protocol is BXI® or Infiniband® respectively, and the high-performance network library is Portals® or Verbs® respectively.

4. The high-performance computer according to claim 1, wherein a network identifier and a process identifier are assigned to each instance of the at least one instance of the high-performance computing and/or storage application, the network identifier being formed from an identifier of the each cluster wherein the each node running the each instance is located, an identifier of the each node running the each instance or of a virtual machine running the each instance, and a physical identifier of the network card of the each node running the each instance.

5. The high-performance computer according to claim 4, wherein at least one node of the plurality of physical computing and/or storage nodes comprises the virtual machine running the each instance.

6. The high-performance computer according to claim 1, wherein the network identifier, the process identifier, and an IP address associated with the network identifier are distributed to communication-library engines of the network cards.

7. The high-performance computer according to claim 1, wherein the communication-library engine is configured to determine whether communication with the destination application instance is inter-cluster by comparing a cluster identifier comprised in the network identifier assigned to the destination application instance with a cluster identifier associated with the network card.

8. The high-performance computer according to claim 1, wherein the identifier in the format of the high-performance network library comprises the network identifier assigned to the destination application instance and the process identifier assigned to the destination application instance.

9. The high-performance computer according to claim 1, wherein the communication-library engine comprises a Portals® engine.

10. A method for inter-cluster communication in a high-performance computer, the high-performance computer comprising a plurality of clusters interconnected by an IP network, wherein each cluster of the plurality of clusters comprises at least one physical Ethernet gateway configured to transmit data between the cluster and the IP network, the at least one physical Ethernet gateway storing at least one first routing table comprising, for each remote cluster of the plurality of clusters, an association between a gateway address of a gateway of the remote cluster, and a destination IP address comprised in the remote cluster;

a plurality of physical computing and/or storage nodes, wherein each node of the plurality of physical computing and/or storage nodes is configured to run at least one instance of a high-performance computing and/or storage application, comprises at least one network card implementing an Ethernet-based high-performance interconnection protocol and configured to implement an address resolution protocol, wherein the at least one network card stores at least one second routing table comprising at least, for each remote cluster of the plurality of clusters, an association between an address of a gateway of the cluster comprising the node, and an identifier of the remote cluster accessible through the gateway of the cluster comprising the node, and at least one third routing table comprising, for each remote cluster of the plurality of clusters, an association of an identifier of an application instance, an identifier of the remote cluster comprising the node running the application instance, a unique network identifier of the application instance, and an IP address of the at least one network card of the node running the application instance; and at least one physical intra-cluster interconnection switch configured to connect said each node and the at least one physical Ethernet gateway;

the method comprising:

receipt, by the at least one network card of a sending node of the plurality of physical computing and/or storage nodes of the first cluster, of a request to send data to at least one destination instance executed by a destination node of the plurality of physical computing and/or storage nodes of a second cluster of the plurality of clusters, the request coming from an instance of a high-performance computing application and comprising an identifier of the at least one destination instance and at least one data item, transcription, by the at least one network card of the sending node, of the request that is received into a request from a network library of the Ethernet-based high-performance interconnection protocol, the transcription of the request comprising a transcription of the identifier of the at least one destination instance into a unique identifier in a format of the network library, wherein the at least one network card comprises a communication-library engine implementing the network library, and wherein the transcription comprises translation, by the communication-library engine, of the identifier of the at least one destination instance into the identifier in the format of the network library, encapsulation, by the at least one network card of the sending node, of the request that is transcribed in an IP packet containing the IP address of a destination network card, encapsulation of the IP packet in an Ethernet frame comprising the address of the gateway of the first cluster, transmission of the Ethernet frame via the at least one physical intra-cluster interconnection switch and the gateway of the first cluster to the gateway of the second cluster, transmission, by the gateway of the second cluster, of the Ethernet frame to the destination network card of the node running the at least one destination instance, decapsulation, by the destination network card, of the Ethernet frame and IP packet to obtain the request comprising the at least one data item, transmission, of the at least one data item, by the destination network card, to the at least one destination instance.

11. The method according to claim 10, further comprising, after the transcription and before the encapsulation in the IP packet, comparison, by the at least one network card of the sending node, of a cluster identifier of the unique network identifier of the at least one destination instance with a cluster identifier of the network card of the sending node, the method being continued only if the cluster identifier of the unique network identifier of the at least one destination instance is different from the cluster identifier of the at least one network card of the sending node.

12. The method according claim 10, further comprising, between the encapsulation of the request in the IP packet and the encapsulation of the IP packet in the Ethernet frame, sending, by the at least one network card of the sending node, of an address resolution request from an IP address of the gateway of the first cluster to obtain a physical address of the gateway of the first cluster, the IP address of the gateway of the first cluster being stored in the at least one second routing table associated with the identifier of the second cluster.

13. The method according to claim 10, further comprising sending an acknowledgment of receipt of the at least one data item, by the receiving network card, to the at least one network card of the sending node.

14. The method according to claim 10, wherein the network library used is a Portals® network library, and wherein the format of the network library is an identifier comprising the unique network identifier of the at least one destination instance and a process identifier of the at least one destination instance.

15. The method according to claim 14, wherein the IP packet comprises a header indicating that the request that is encapsulated is a Portals® request.

* * * * *